US012780169B2

(12) United States Patent
Roberts

(10) Patent No.: US 12,780,169 B2
(45) Date of Patent: Nov. 3, 2026

(54) BRAKE ACTUATOR WITH CLAMP RING, CLAMP RING, METHOD OF ASSEMBLING A BRAKE ACTUATOR AND METHOD OF MANUFACTURING A CLAMP RING

(71) Applicant: Bendix Commercial Vehicle Systems LLC, Avon, OH (US)

(72) Inventor: Will E. Roberts, Elyria, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 0 days.

(21) Appl. No.: 18/904,701

(22) Filed: Oct. 2, 2024

(65) Prior Publication Data

US 2026/0091768 A1 Apr. 2, 2026

(51) Int. Cl.

| | |
|---|---|
| ***B60T 17/08*** | (2006.01) |
| *B65D 63/06* | (2006.01) |
| *F16D 65/28* | (2006.01) |

(52) U.S. Cl.

CPC ............ *B60T 17/083* (2013.01); *B65D 63/06* (2013.01); *F16B 2200/509* (2018.08); *F16D 65/28* (2013.01); *Y10T 24/1457* (2015.01); *Y10T 24/1469* (2015.01); *Y10T 24/1478* (2015.01)

(58) Field of Classification Search

CPC ....... B60T 17/083; F16D 65/28; B65D 63/06; F16B 2200/509; Y10T 24/1457; Y10T 24/1469; Y10T 24/1478

See application file for complete search history.

(56) References Cited

U.S. PATENT DOCUMENTS 2,053,739 A * 9/1936 Prindle .................. B65D 63/06 24/23 W
2,118,158 A * 5/1938 Carlson .................. B65D 63/06 24/23 W
2,273,007 A * 2/1942 Cooper .................. B65D 63/06 24/23 W
2,740,503 A 4/1956 Wesa (Continued)

FOREIGN PATENT DOCUMENTS

GB 111919 12/1917

OTHER PUBLICATIONS

Bendix, Installation Instructions, Bendix® Brand Service Kit for Double Diaphragm, Piston-Style, and Service Brake Chambers on Bendix® Air Disc Brakes, S-1542, 2012 Bendix Spicer Foundation Brake LLC, a member of the Knorr-Bremse Group (4 pages).

(Continued)

*Primary Examiner* — Dustin T Nguyen

(74) *Attorney, Agent, or Firm* — Crowell & Moring LLP

(57) ABSTRACT

A brake actuator includes a housing having a first housing component with a first annular flange and a second housing component with a second annular flange, wherein the first and second annular flanges are overlapping. A clamp ring extends circumferentially around the first and second housing components and engages the first and second annular flanges. The clamp ring includes a first end having a first tab and a second end having a second tab, wherein the second tab is spaced radially outwardly from and overlies the first tab. A deformable member couples the first and second tabs. A clamp ring, methods of manufacturing the clamp ring, and methods of assembling the brake actuator are also provided.

5 Claims, 5 Drawing Sheets

(56) References Cited

U.S. PATENT DOCUMENTS

| | | | | |
|---|---|---|---|---|
| 2,760,262 | A * | 8/1956 | Homan | B65D 25/32 215/397 |
| 5,193,432 | A * | 3/1993 | Smith | B60T 17/083 403/373 |
| 5,433,138 | A * | 7/1995 | Choinski | B60T 17/085 403/338 |
| 7,610,846 | B2 * | 11/2009 | Chow | B60T 17/088 92/128 |
| 8,516,661 | B2 * | 8/2013 | Maskell | F16B 2/08 24/23 R |
| 9,546,700 | B2 | 1/2017 | Plantan et al. | |
| 2004/0134343 | A1 | 7/2004 | Ashley et al. | |

OTHER PUBLICATIONS

Bendix, Service Data, Bendix® EnduraSure™ and EnduraSure™-Pro Spring Brake Chambers, SD-02-4525, 2017 Bendix Spicer Foundation Brake LLC. All Rights Reserved (12 pages).

* cited by examiner

BRAKE ACTUATOR WITH CLAMP RING, CLAMP RING, METHOD OF ASSEMBLING A BRAKE ACTUATOR AND METHOD OF MANUFACTURING A CLAMP RING

FIELD OF THE INVENTION

The present application relates generally to a spring brake, and in particular to a brake actuator configured with a clamp ring and crimping sleeve, together with methods for the assembly and manufacture thereof.

BACKGROUND

Air brake systems may include a spring brake actuator configured with a service brake chamber and an emergency spring mechanism. Typically, the brake actuator includes a serviceable section and a non-serviceable piggyback section, which is secured to the serviceable section with a clamp ring, otherwise referred to as a clamp band. The non-serviceable piggyback section may be replaced if damaged or otherwise rendered inoperable, for example by removing the clamp ring and separating the piggyback section. In some circumstances, it may be important for the mechanic or operator to know whether the piggyback section was an original component of the brake actuator, for example to help with quality control and/or determine whether the replacement is covered by warranty. Accordingly, it may be helpful to secure the piggyback section to the serviceable section with a tamper-proof clamp ring.

Previous clamp ring configurations include for example a stamped circular ring that may be formed over the joint between the piggyback section and the serviceable section. Such a design results in a large amount of waste material from the center section of the ring. In another clamp ring design, a continuous roll of band material may be cut, with the ends thereof welded to form the ring. In yet another clamp design, a portion of material on one of the housings may be wrapped/deformed over a portion on the other housing and then crimped to secure the mating housings. All of these designs, while tamper proof, are not easily disassembled to allow for the replacement of the piggyback section. Conversely, a standard clamp ring may be secured with one or more bolts and nuts, which increases the overall costs of the system, and while easily removed, does not provide a tamper proof system.

As such, the need remains for an inexpensive, tamper proof clamp ring that may be easily installed and removed.

SUMMARY

The present invention is defined by the following claims, and nothing in this section should be considered to be a limitation on those claims.

In one aspect, one embodiment of a brake actuator includes a housing having a first housing component with a first annular flange and a second housing component with a second annular flange, wherein the first and second annular flanges are overlapping. A clamp ring extends circumferentially around the first and second housing components and engages the first and second annular flanges. The clamp ring includes a first end having a first tab and a second end having a second tab, wherein the second tab is spaced radially outwardly from and overlies the first tab. A deformable member couples the first and second tabs. In one embodiment, the deformable member is a crimping sleeve.

In another aspect, one embodiment of a clamp ring includes axially spaced first and second annular flanges joined by a side wall, wherein the first and second annular flanges have circumferentially spaced ends. A first tab extends from a first end of the side wall. A second tab extends from a second end of the side wall opposite the first end. The second tab is spaced radially outwardly from and overlies the first tab when in the clamp ring is in an installed position.

In another aspect, one embodiment of a method of assembling a brake actuator includes positioning a first housing component having a first annular flange adjacent a second housing component having a second annular flange such that the first and second annular flanges are aligned and overlapping, wrapping a clamp ring circumferentially around the first and second housing components and engaging the first and second annular flanges with the clamp ring, overlapping a first tab extending from a first end of the clamp ring with a second tab extending from a second end of the clamp ring, wherein the second tab is spaced radially outwardly from the first tab, and coupling the first and second tabs with a crimp sleeve.

In yet another aspect, one embodiment of a method of manufacturing a clamp ring includes cutting a piece of band material from a continuous spiraled coil of the band material, trimming a first end of the piece of band material to form a first tab, and trimming a second end of the piece to form a second tab.

Various other methods of using, assembling and manufacturing the brake chamber, and components thereof, are also provided.

The various embodiments of the brake actuator and components, and methods for the use, assembly and manufacture thereof, provide significant advantages over other brake actuators and components. For example, and without limitation, the clamp ring can be quickly and easily manufactured from a continuous spiral coil of band material, thereby reducing waste. The trimming process may be done quickly and easily, again with minimal waste. The ring may then be quickly and easily installed on the brake actuator, with a deformable member, such as crimp sleeve, being installed to secure the clamp ring in a tamper proof configuration. Conversely, when needed, the clamp ring can be easily removed simply by cutting one or both of the tabs on the clamp ring. The clamp ring and crimp sleeve may then be recycled.

The foregoing paragraphs have been provided by way of general introduction, and are not intended to limit the scope of the claims presented below. The various preferred embodiments, together with further advantages, will be best understood by reference to the following detailed description taken in conjunction with the accompanying drawings.

DETAILED DESCRIPTION OF THE PRESENTLY PREFERRED EMBODIMENTS

It should be understood that the term "plurality," as used herein, means two or more. The term "longitudinal," as used herein means of or relating to an axial direction or axis 2, for example an actuation direction of a spring brake, as shown for example in FIGS. 1-3. The term "radial," as used herein, means situated on, directed radially outwardly from the axis 2. The term "transverse" means non-parallel. The term "outwardly" refers to a direction facing away from a centralized location, for example the phrase "radially outwardly" refers to a feature diverging away from a centralized location, for example axis 2. It should be understood that features or components facing or extending "outwardly" do not necessarily originate from the same centralized point, but rather generally emanate outwardly and exteriorly along a non-tangential vector. Conversely, the term "inwardly" refers to a direction facing toward the centralized or interior location.

The term "coupled" means connected to or engaged with, whether directly or indirectly, for example with an intervening member, and does not require the engagement to be fixed or permanent, although it may be fixed or permanent. The terms "first," "second," and so on, as used herein are not meant to be assigned to a particular component so designated, but rather are simply referring to such components in the numerical order as addressed, meaning that a component designated as "first" may later be a "second" such component, depending on the order in which it is referred. It should also be understood that designation of "first" and "second" does not necessarily mean that the two components or values so designated are different, meaning for example a first direction may be the same as a second direction, with each simply being applicable to different components.

Figure 1:
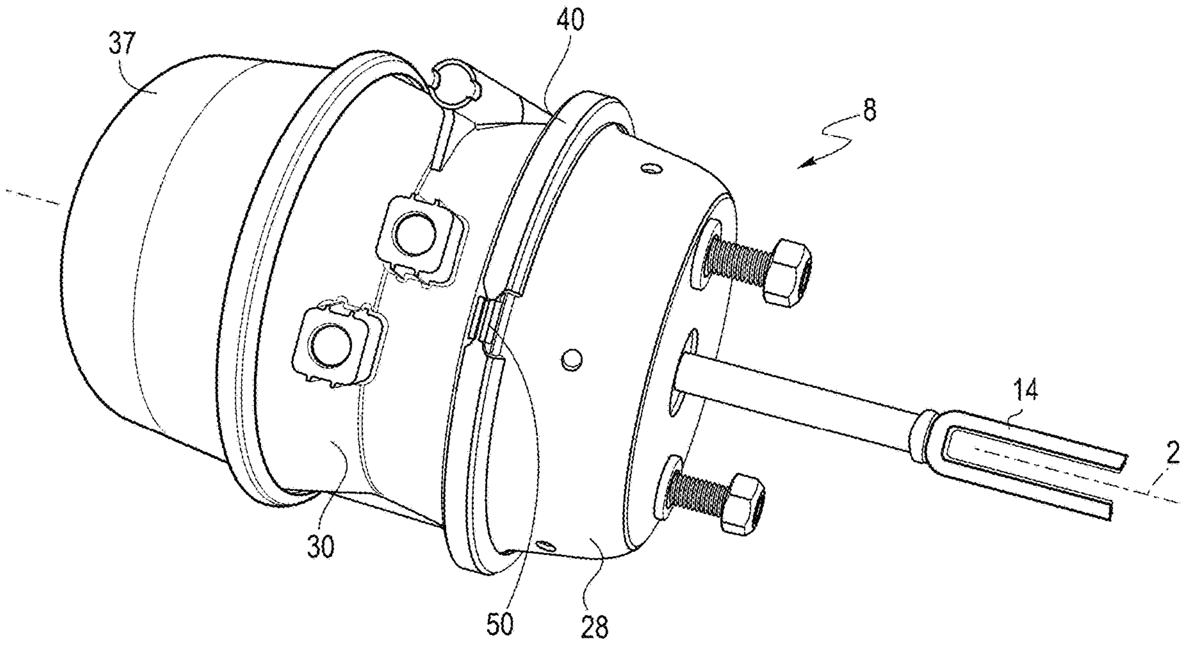
FIG. 1 is a perspective view of one embodiment of a brake actuator
Figure 2:
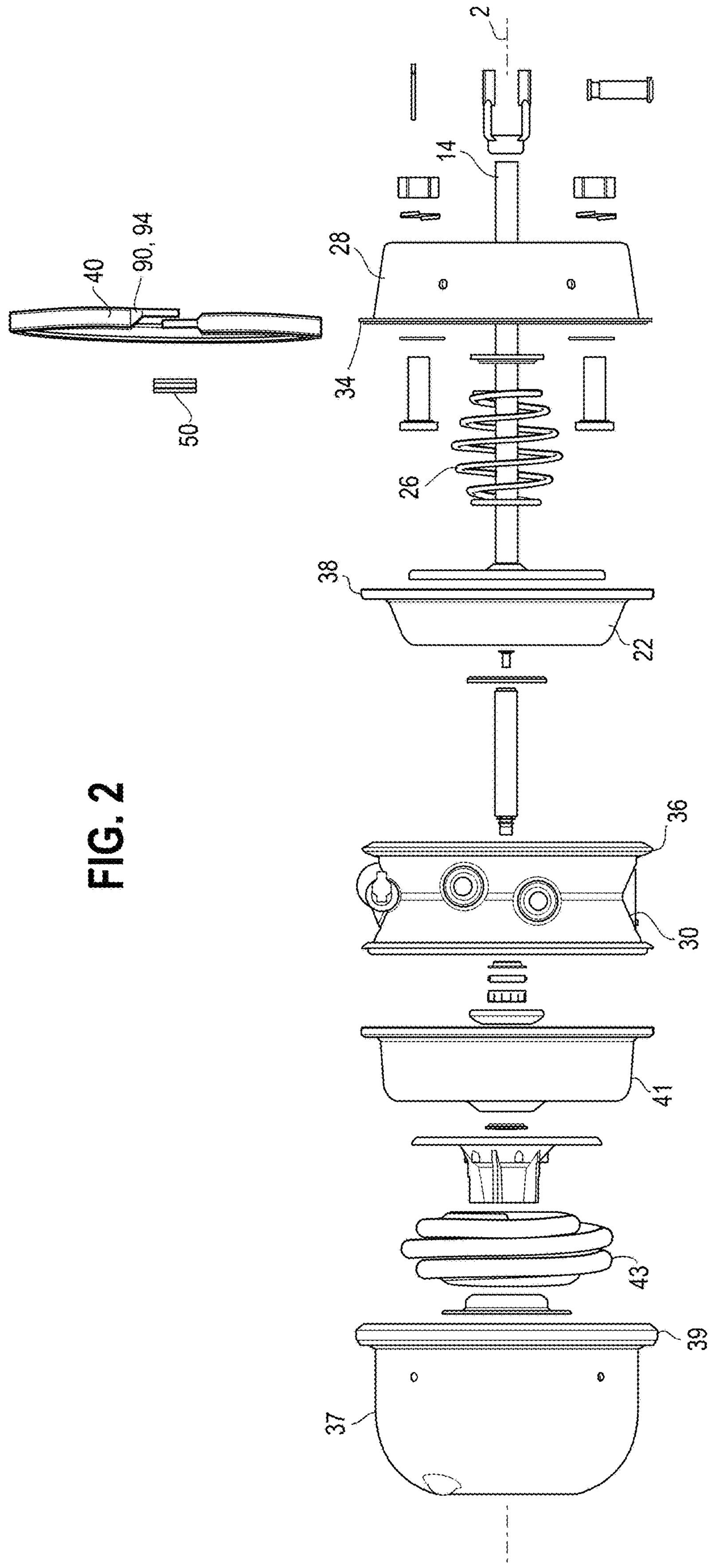
FIG. 2 is an exploded, perspective view of the brake actuator.
Figure 3:
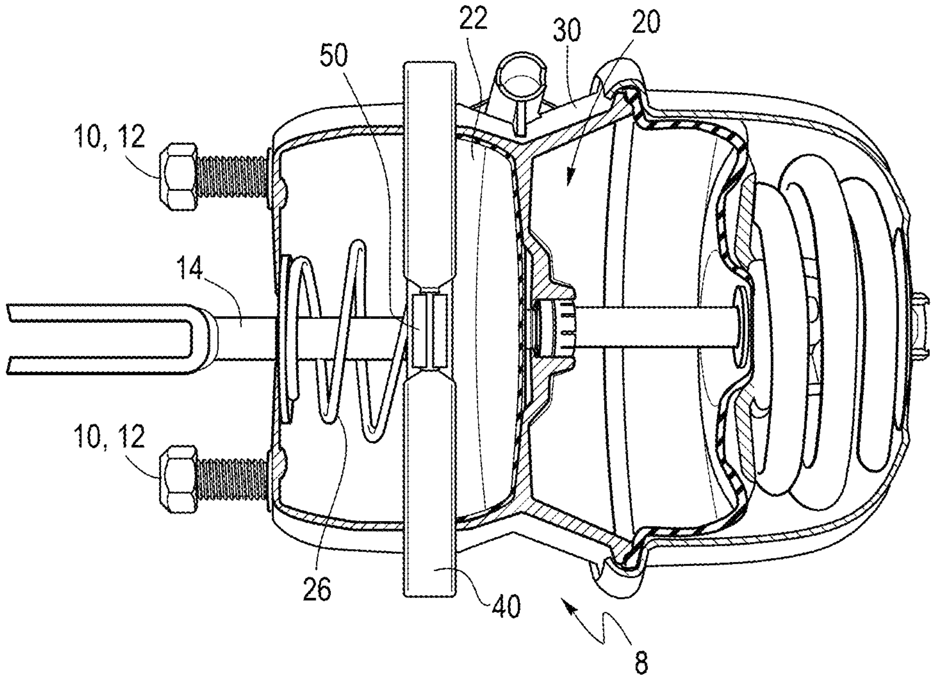
FIG. 3 is a cross-sectional view of one embodiment of a brake actuator.
Figure 4:
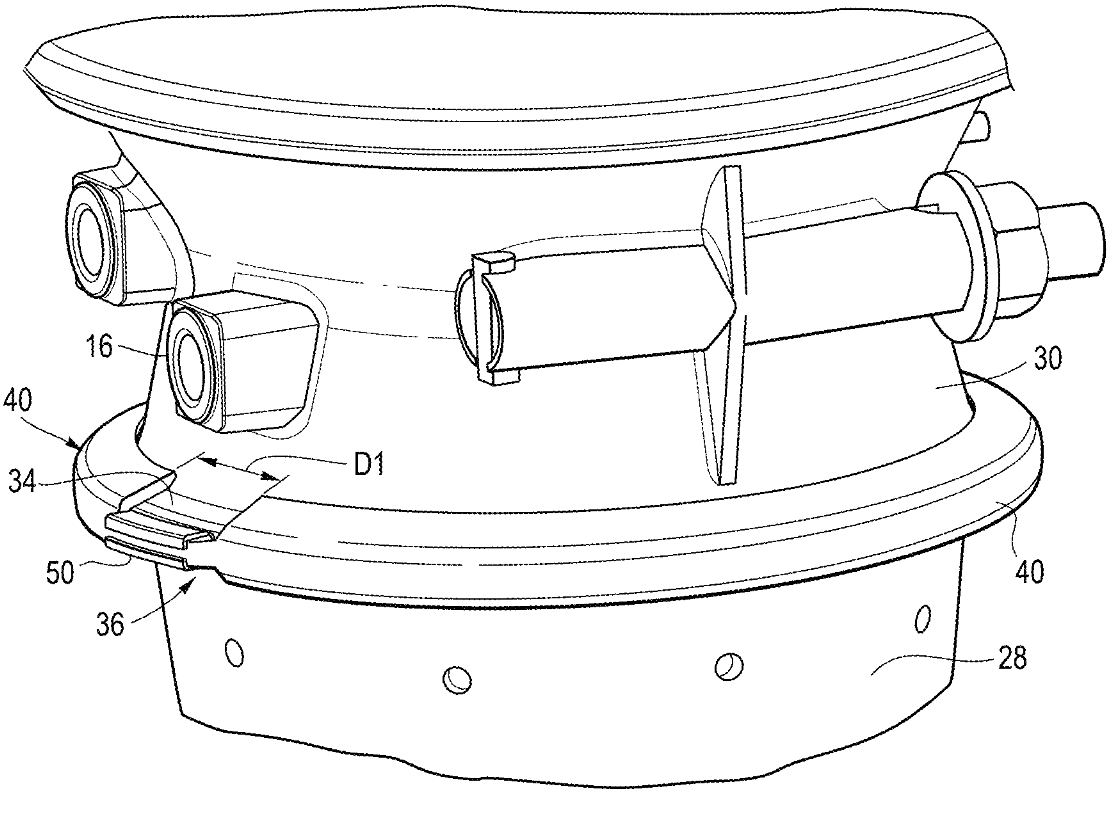
FIG. 4 is a partial side perspective view of a clamp ring and crimp sleeve coupling first and second housings.

Referring to FIGS. 1-3, an air brake system includes a brake actuator 8 having a push rod 14, which actuates the brakes of a vehicle. An actuator 8 may be incorporated into various brake systems, including air disc brake system or air drum brake systems.

Referring to FIGS. 1-3, the actuator 8 includes an air supply port 16 in fluid communication with a service brake chamber 20. As air is introduced into the chamber during application of the vehicle brakes, the air applies pressure in the chamber 20 and expands a diaphragm 22, which in turn applies a force to and moves a pressure plate 24 and the push rod 14 in the axial direction 2. When the vehicle brakes are released, the air pressure in the service brake chamber 20 is exhausted, with a return spring 26 acting on the diaphragm.

Referring to FIGS. 1-4, the brake actuator includes a conventional service brake housing chamber, including a housing component 28, and an emergency, or parking, spring mechanism for use on vehicles. The spring brake chamber provides: (1) service braking; (2) parking; and (3) emergency braking. The actuator 8 includes the non-pressure housing component 28 and a piggy back chamber assembly 35, including a housing component 30. The chamber housing assembly 35 includes a spring housing 37 coupled to the housing component, for example with a crimped band portion 39, and with a diaphragm 41 and spring 43 disposed therein. The chamber housing component 30 may be coupled to various input or system arrangements, such that the brake actuator may be automatically or manually applied under emergency braking conditions. The spring brake actuator 8 is a diaphragm-type actuator 8 which converts the energy of air pressure into mechanical force. The diaphragm 22 has an annular flange 38, which is clamped between the first and second housing components 28, 30, each having an annular flange 34, 36. The housing components 28, 30 may be axially aligned such that the annular flanges 34, 36 are overlapping, with an annular, peripheral edge portion 38 of the diaphragm 22 disposed and clamped between the flanges 34, 36.

Figure 5:
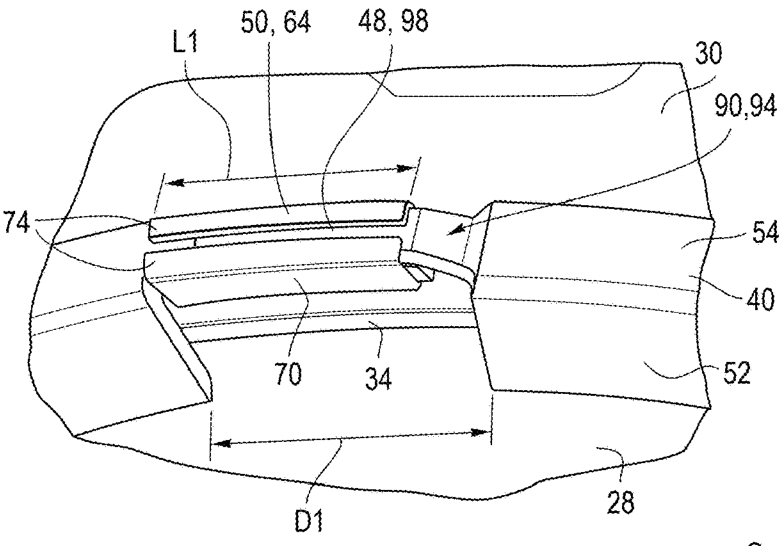
FIG. 5 is an enlarged, partial view of the crimp sleeve coupling first and second tabs of a clamp ring.
Figure 7:
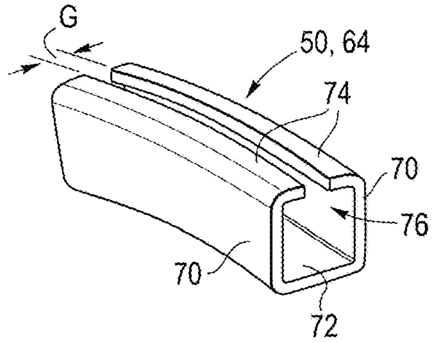
FIG. 7 is a perspective view of one embodiment of a crimping sleeve.
Figure 6:
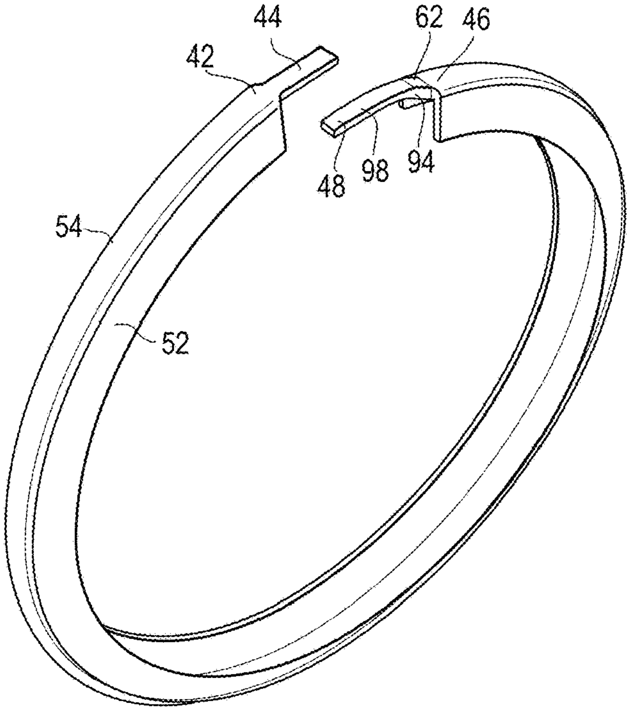
FIG. 6 is a perspective view of one embodiment of a clamp ring.

Referring to FIGS. 1-7, a clamp ring 40 extends circumferentially around the first and second housing components 28, 30 and engages the first and second annular flanges 34, 36, for example by surrounding the annular flanges 34, 36 and overlying opposite upper and lower surfaces thereof. The clamp ring 40 includes a first end 42 having a first tab 44 and a second end 46 having a second tab 48. In one embodiment, the second tab 48 is spaced radially outwardly from and overlies the first tab 44 when the clamp ring 40 is in an installed position as shown in FIG. 5. In this installed position, the ends of the side walls are spaced apart a distance D1, which is greater than the length L1 of a deformable member 50. The second tab 48 may include a bent portion 94, which spaces the second tab 48 radially outwardly from the first tab 44. A deformable member 50 couples the first and second tabs 44, 48. The clamp ring 40 clamps the annular edge portion 38 of the diaphragm 22 between the first and second annular flanges 34, 36. The clamp ring 40 has a C-shaped cross section defined by a pair of spaced apart annular flanges 52 joined by a side wall 54. The gap or space between the annular flanges 52 is dimensioned to receive the overlapping annular flanges 34, 36. The first and second tabs 44, 48 extend from first and second ends 60, 62 of the side wall 54.

Figure 8:
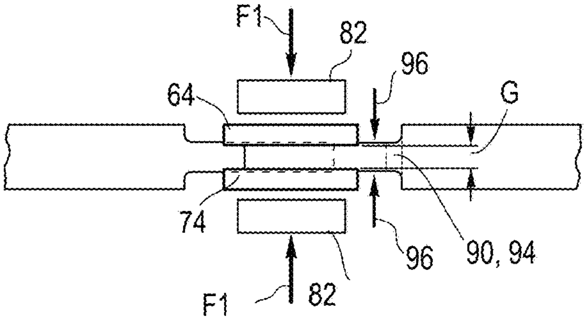
FIG. 8 is a schematic illustration of a crimping action.

The phrase "deformable member" refers to a component that may be deformed, for example plastically, so as to engage another component in a non-moveable manner. In one embodiment, the deformable member 50 may be configured as a crimp sleeve 64, which is deformable, and may be bent or pinched, between an unclamped configuration and a clamped configuration. In one embodiment, the crimp sleeve 64 may have a C-shaped cross section defined by a pair of spaced apart annular flanges 70 joined by a side wall 72. Each of the annular flanges 70 includes an inwardly turned end portion 74, or lip, with the end portions defining a slot, or gap "G" therebetween. The crimp sleeve 64 defines a channel 76, which is shaped and dimensioned to receive the overlapping tabs 44, 48. The crimp sleeve 64 may be disposed over the overlapping tabs 44, 48, such that the tabs 44, 48 are disposed in the channel 76, with the side wall 72 positioned adjacent one of the tabs, for example adjacent the first tab 44 positioned radially inwardly of the second tab 48. Referring to FIG. 8, a crimping tool may include at least first and second crimping members 82 that may apply opposing forces F1 to the flanges, and/or side wall and end portions, thereby deforming and pressing the flanges, side wall and/or end portions against the tabs 44, 48 so as to thereby coupled the tabs 44, 48 and secure the clamp ring 40 to the brake actuator 8 and clamp the diaphragm 22 between the first and second housing components 34, 36. During the deforming (e.g., crimping) process, the gap G may be reduced. The clamp ring and deformable member may be made of metal, such as steel, stainless steel, aluminum, or other suitable materials.

While the deformable member is shown as a separate component, such as the crimp sleeve, in other embodiments the deformable member may be integrally formed with the clamp ring, for example as a portion of one of the tabs that may surround and be crimped to the other of the tabs. Or the tabs may be welded together, or otherwise connected, with the weld defining the deformable member.

Referring to FIG. 5, an exposed portion 90, shown as the bent portion 94 in one embodiment, of at least one of the first and second tabs 44, 48 remains uncovered by the deformable member in the clamped position, due in part to L1<D1. The exposed portion 90 may be cut, for example with a saw 96 or abrasive disc, as shown in FIG. 8, to thereby free or decouple the ends 42, 46 of the clamp ring 40. As mentioned, in one embodiment, the second tab 48 includes the bent portion 94 defining the exposed portion 90, and an overlapping portion 98.

In operation, one method of assembling the brake actuator 8 includes positioning the first housing component 28 having the first annular flange 34 adjacent a second housing 30 having the second annular flange 36 such that the first and second annular flanges 34, 36 are aligned and overlapping. The annular flange 38 of the diaphragm 22 may be disposed between the annular flanges 34, 36. The method further includes wrapping the clamp ring 40 circumferentially around the first and second housings 28, 30 and engaging the first and second annular flanges 34, 36 with the clamp ring 40, overlapping the first tab 44 extending from the first end 42 of the clamp ring with the second tab 48 extending from the second end 46 of the clamp ring, wherein the second tab 48 is spaced radially outwardly from the first tab 44. The method includes coupling the first and second tabs 44, 48 with a deformable member, such as the crimp sleeve 64, or by welding or otherwise connecting the tabs 44, 48, with the weld defining the deformable member. Wrapping the clamp ring 40 circumferentially around the first and second housing components 28, 30 includes engaging the first and second annular flanges 34, 36 of the first and second housing components 28, 30 with the pair of annular flanges of the clamp ring. Coupling the first and second tabs 44, 48 with the crimp sleeve 64 includes leaving the exposed portion 90 of at least one of the first and second tabs uncovered by the crimp sleeve. When the tabs 44, 48 are alternatively welded, a portion of one of the tabs is exposed. Once installed, the clamp ring 40 is tamper proof, meaning the clamp ring cannot be removed without damaging the clamp ring 40, thereby preventing it from being reinstalled. As such, the configuration of the clamp ring and deformable member provides indicia to a mechanic or other installed that the brake actuator is the original equipment, and has not been modified or had components thereof replaced. If the piggyback section is to be replaced, an installer may sever the exposed portion 90 of the at least one of the first and second tabs 44, 48, thereafter remove the clamp ring 40 from the first and second housings 28, 30, and install a second clamp ring on the first and second housings. The second clamp ring may be installed in the same manner with a crimp sleeve, or may be configured as a conventional clamp ring with one or more bolts.

Figure 9:
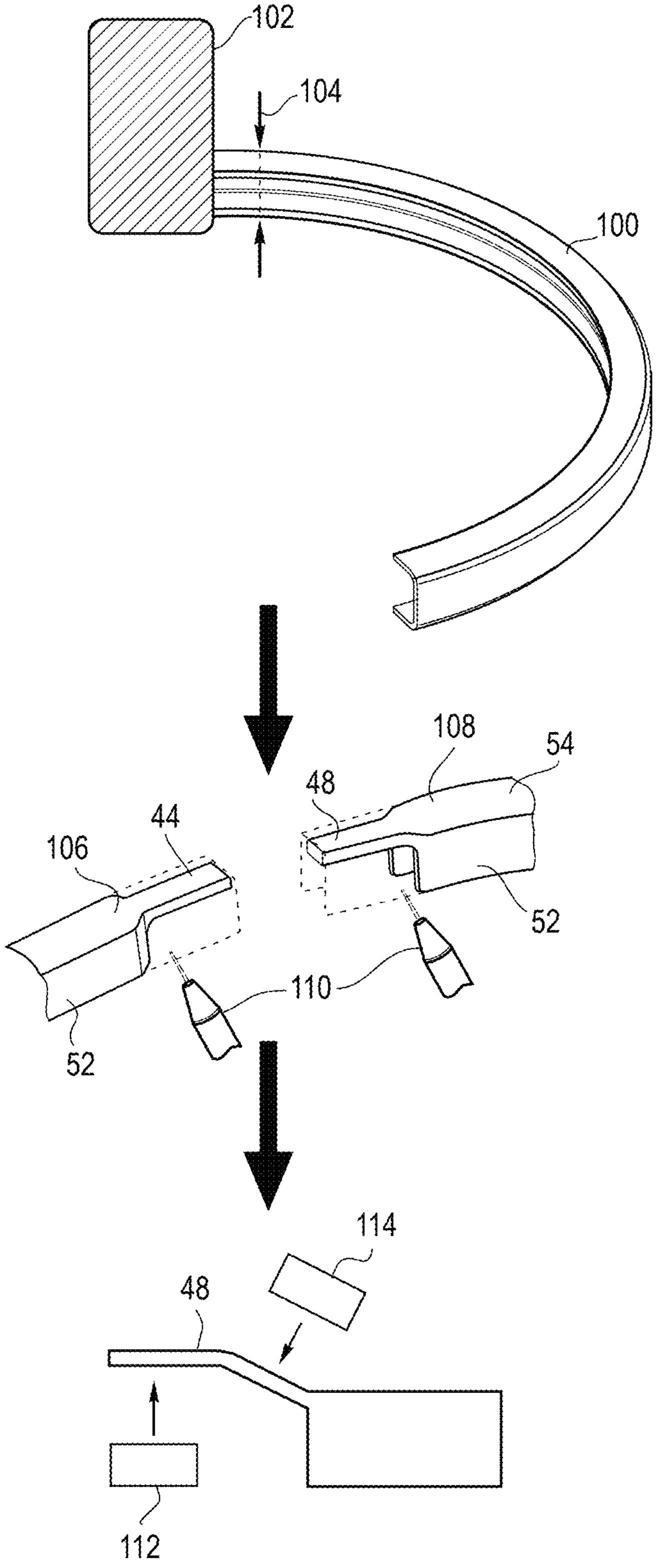
FIG. 9 is a schematic illustration of a clamp ring manufacturing process.

Referring to FIG. 9, one method of manufacturing the clamp ring 40 includes cutting a piece of band material 100 from a continuous spiraled coil 102 of the band material, for example with a shearing tool or saw 104, trimming a first end 106 of the piece of band material to form the first tab 44, and trimming a second end 108 of the piece to form the second tab 48. The trimming operations may be carried out by trimming device 110, which may be performed by a stamping or a cutting operation, for example laser or water-jet cutting, or with a saw. The method may further include bending the second tab 48, for example with one or more bending tools 112, 114, such as anvils, to form the bent portion 94 such that the second tab 48 is disposed radially outwardly from the first tab 44. Trimming the first and second ends 106, 108 to form the first and second tabs 44, 48 may include trimming the annular flanges 52 such that the first and second tabs extend from first and second ends of the side wall 54 respectively.

Although the present invention has been described with reference to preferred embodiments, those skilled in the art will recognize that changes may be made in form and detail without departing from the spirit and scope of the invention. As such, it is intended that the foregoing detailed description be regarded as illustrative rather than limiting and that it is the appended claims, including all equivalents thereof, which are intended to define the scope of the invention.

What is claimed is:

1. A brake actuator comprising:

a housing comprising:

a first housing component comprising a first annular flange; and a second housing component comprising a second annular flange, wherein the first and second annular flanges are overlapping;

a clamp ring extending circumferentially around the first and second housing components and engaging the first and second annular flanges, wherein the clamp ring comprises:

a first end, wherein a first tab extends from the first end; and a second end, wherein a second tab extends from the second end, wherein the second tab has a bent portion and an overlapping portion, and wherein the overlapping portion of the second tab is spaced radially outwardly from and overlies the first tab; and a deformable member coupling the first and second tabs, wherein the deformable member is disposed over the first tab and the overlapping portion of the second tab, wherein the deformable member comprises a crimp sleeve;

wherein a gap between the deformable member and the second end of the clamp ring exposes the bent portion of the second tab to be cut to free the coupled first and second tabs; and wherein a gap is not present between the deformable member and the first end of the clamp ring to cut free the coupled first and second tabs.

2. The brake actuator of claim 1 further comprising a diaphragm comprising an annular edge portion disposed between the first and second annular flanges.

3. The brake actuator of claim 1 wherein the clamp ring comprises a C-shaped cross section defined by a pair of annular flanges joined by a side wall.

4. The brake actuator of claim 3 wherein the first and second tabs extend from first and second ends of the side wall.

5. The brake actuator of claim 1, wherein a size of the gap between the deformable member and the second end of the clamp ring is defined by a difference between a length of the deformable member and a distance between the first and second ends of the clamp ring.

* * * * *